April 18, 1961 N. MATZ 2,980,318

NUTATING DISC GAS COMPRESSOR OR MOTOR

Filed Dec. 9, 1957 5 Sheets-Sheet 1

INVENTOR.
NORMAN MATZ
BY
Hill, Sherman, Meroni, Gross & Simpson
ATTORNEYS

April 18, 1961   N. MATZ   2,980,318
NUTATING DISC GAS COMPRESSOR OR MOTOR
Filed Dec. 9, 1957   5 Sheets-Sheet 2

INVENTOR.
NORMAN MATZ
BY
ATTORNEYS

INVENTOR.
NORMAN MATZ

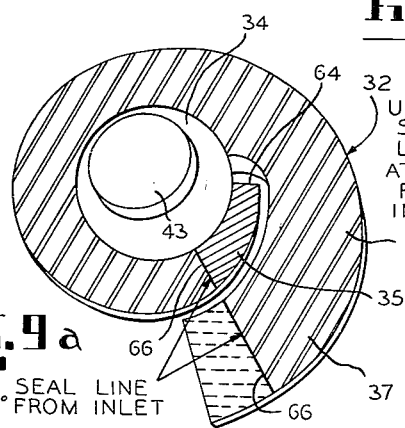
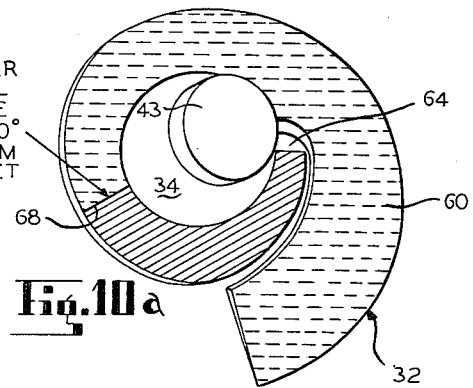
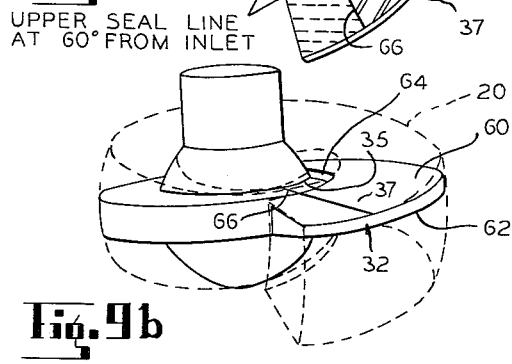
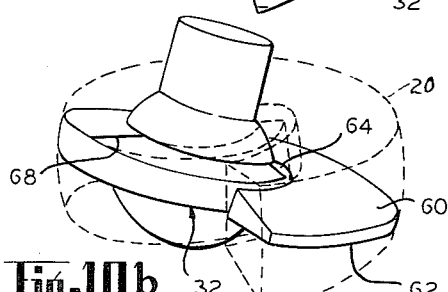
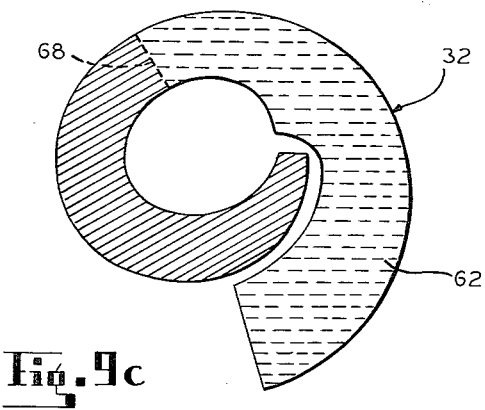
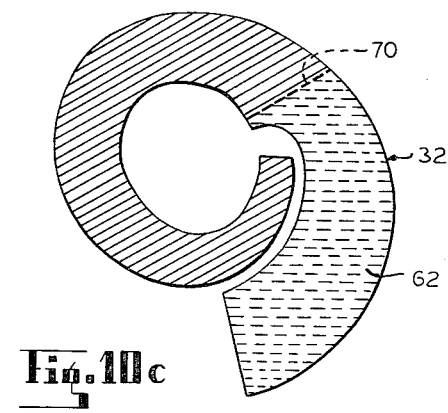

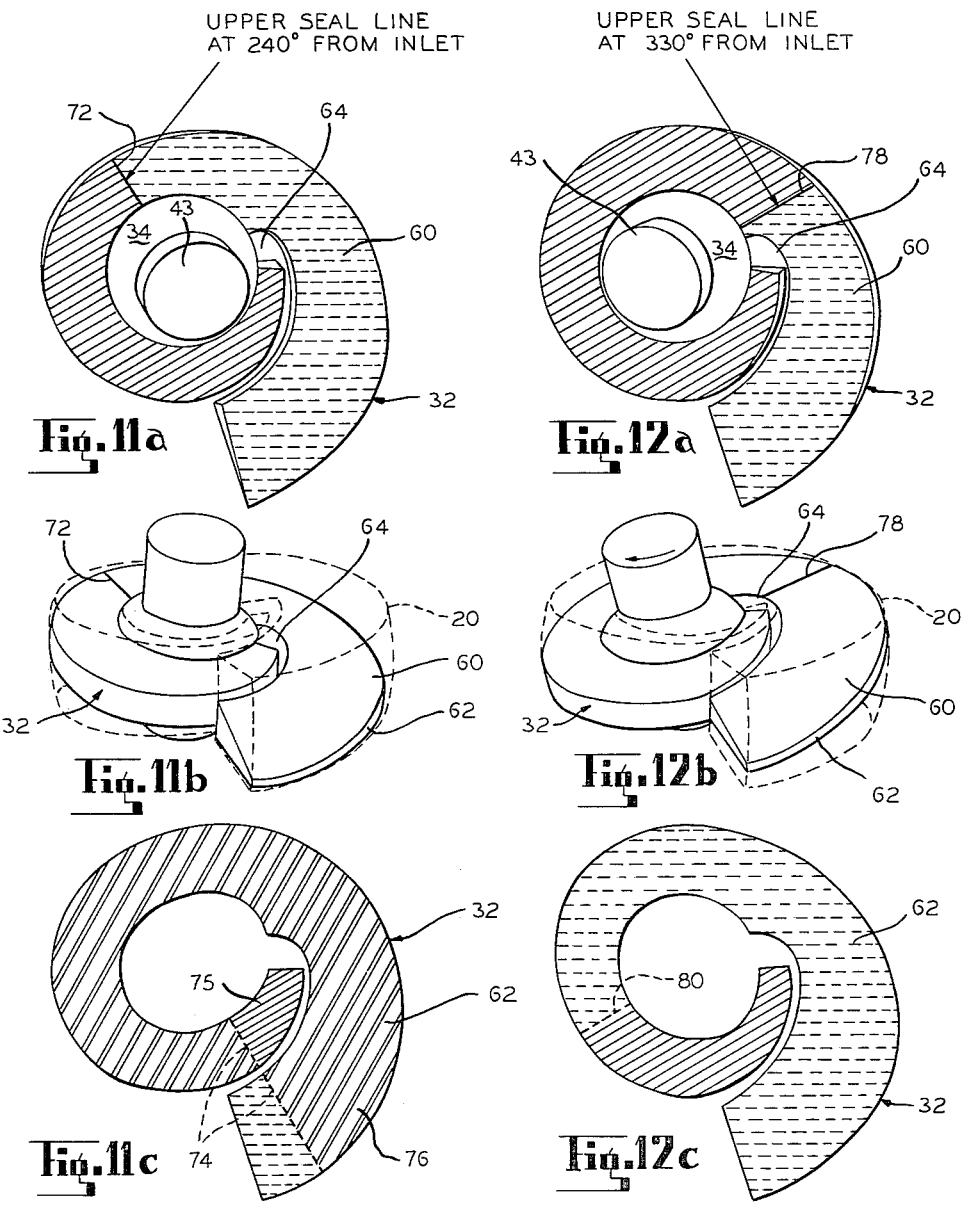

United States Patent Office 2,980,318
Patented Apr. 18, 1961

2,980,318

NUTATING DISC GAS COMPRESSOR OR MOTOR

Norman Matz, Cleveland Heights, Ohio, assignor to Thompson Ramo Wooldridge Inc., a corporation of Ohio Filed Dec. 9, 1957, Ser. No. 701,486

16 Claims. (Cl. 230—148)

The present invention relates to an improved gas compressor or motor. More specifically, the invention relates to a compressor or motor having a volute-shaped chamber with a volute-shaped nutating plate located therein to be driven by expanding gas, if operated as a motor, or to compress gas with the plate being mechanically driven, if operated as a compressor.

An object of the invention is to provide an improved gas motor having a nutating plate within a chamber with both the plate and chamber being volute-shaped to provide for adiabatic expansion of gas for driving the plate.

Another object of the invention is to provide an improved motor driven by an expansible gas wherein added work is obtained by allowing adiabatic expansion of the gas.

A further object of the invention is to provide an improved gas operated motor utilizing a volute-shaped chamber with a spiral-shaped nutating plate therein, wherein the chamber shape is designed in accordance with the specific heat of the gas to be used in operating the motor.

A further object of the invention is to provide a gas operated motor having a volute-shaped chamber with a spiral-shaped nutating plate therein with the chamber designed for adiabatic expansion of the gas between the parameters of the inlet pressure of the gas and the discharge pressure.

A still further object of the invention is to provide a volute-shaped nutating disc and chamber in accordance with the above objectives which is operable as either a gas driven motor or a gas compressor.

A feature of the invention is to provide a mechanism which may be used as a motor or a compressor and which employs a nutating disc within a chamber wherein the chamber coacts with the disc to divide the area of the disc into zones of different pressure with three separate distinct pressure zones being formed during a portion of the movement of the disc.

Other objects and advantages will become more apparent with the teachings of the principles of the invention in connection with the disclosure of the preferred embodiments thereof, in the specification, claims and drawings, in which:

Figure 8 is a showing in legend of the shading used in Figures 9, 10, 11 and 12 to indicate the different pressure areas;

Figure 1:
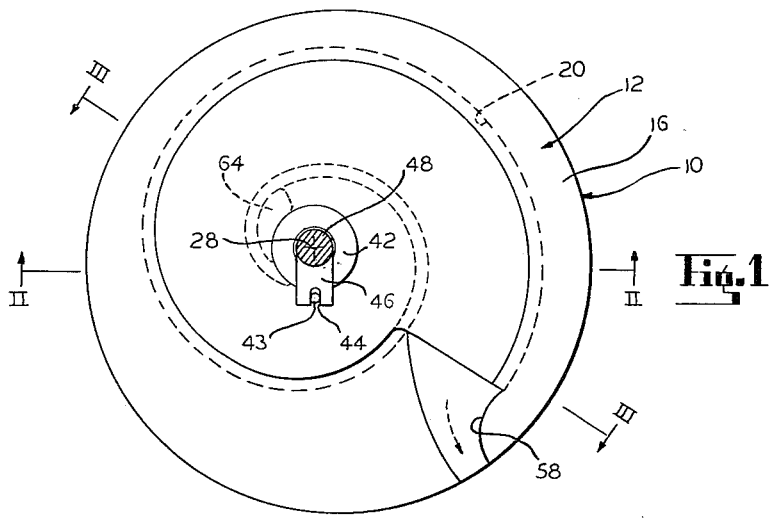
Figure 1 is a plan view of a nutating disc motor or compressor constructed in accordance with the principles of the invention.

Figures 9a, 10a, 11a, and 12a are plan views of the nutating disc taken from the top of the disc and with shading to show the different pressure areas in successive positions of the disc;

Figures 9b, 10b, 11b, and 12b are schematic perspective illustrations of the nutating disc showing its successive positions corresponding to positions of the disc in plan view in Figures 9a, 10a, 11a, and 12a; and Figures 9c, 10c, 11c, and 12c are plan views of the nutating disc taken from the bottom of the disc and shaded to illustrate the pressure zones for successive positions of the disc with the figures corresponding to the illustrations of Figures 9 through 12 designated a and b.

As illustrated in Figures 1 through 5, the mechanism will be described as utilized as a motor. It will be understood that the mechanism may also be utilized as a compressor, as will later be described, and also that various features of the invention may be used in arrangements other than the preferred embodiment illustrated, which is shown for purposes of describing and teaching the principles of the invention, and not by way of limitation.

The motor is illustrated having a housing 10 formed with an upper section 12 and a lower section 14. Each of the sections is provided with an annular flange, and the upper section has a flange 16 and the lower section has a flange 18. These flanges are positioned against each other and suitably clamped together, such as by bolts which are not shown. Suitable gasket means may be also provided between the flanges to prevent the leakage of gases.

Figure 2:
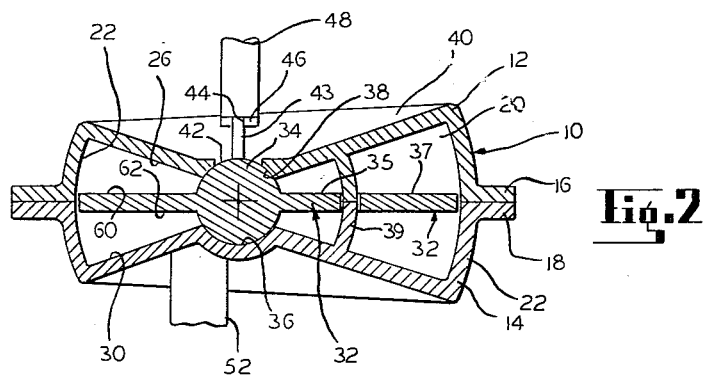
Figure 2 is a vertical sectional view taken along line II—II of Figure 1, and illustrating the interior construction of the motor or compressor.

Within the housing 10, is formed a curved, preferably volute shaped, motor chamber 20. The outer spiral wall 22 of the motor chamber is spiral shaped in plan view, as illustrated in Figure 1, and is curved in a vertical direction, as illustrated in Figure 2, with the curvature being swung from an arc about the radial center 28 of the chamber.

The upper surface 26 of the chamber is a curved tapered surface which increases in diameter about the axial center 28 of the motor. The lower surface 30 of the motor chamber 20 is likewise a curved tapered surface, with the two surfaces 26 and 30 tapering toward each other toward the center of the motor.

Figure 4:
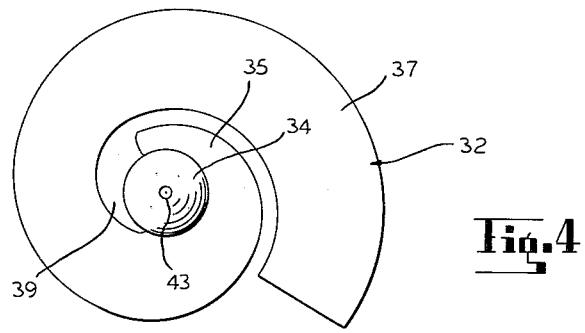
Figure 4 is a plan view of the nutating disc or plate.

Within the motor chamber 20 is located a spirally-shaped nutating plate 32 which is shown in plan in Figure 4 as removed from the motor chamber.

The plate 32 has a width which increases as the width of the chamber 20 to extend across the chamber and divide it so as to separate the lower and upper portions of the chamber. The plate 32 is mounted within the chamber so as to be driven in a wobbling or nutating motion as an expansible gas is admitted to the motor chamber 20, alternately above and below the plate or disc 32.

For supporting the spirally-shaped wobble plate 32, it is mounted on its center on a sphere 34 which is held in a socket 36 in the central lower portion of the chamber 20, and by a fragmentary spherical surface 38 in the upper portion of the motor chamber 20. As shown in Figure 4, the plate separates at 39 from the sphere 34. Thus, the operative or effective surface of the disc extends for a distance more than 360° around the center supporting sphere 34. The surfaces which extend past each other, shown at 35 and 37 in Figures 2 and 4, are separated by a vertical web 39, Figures 2 and 3.

The upper wall 40 of the housing 10 has a central opening 42 which is sealed from the chamber 20 to prevent the escape of gas from the chamber by the contact between the plate supporting sphere 34 and the fragmentary spherical bearing surface 38. Secured to the supporting sphere 34 is a driving crank pin 43 which rotates as the plate wobbles within the motor chamber 20. For receiving driving power from the plate, the pin projects into a slot 44 within a crank arm 46 attached to a driven shaft 48. In the event the mechanism is to be used as a compressor, the shaft 48 is driven by a motor, and as it rotates the pin 43 will be rotated to drive the disc or plate 32 for compressing gas.

The housing 10 is provided with an annular hollow boss 52 providing a gas inlet passage 50 which leads to an opening 54 communicating with the inlet 64 into the chamber at the small end thereof. The gas is exhausted from the large end of the chamber through an exhaust port 58.

The passage of gas through the motor drives the nutating plate 32. The motor chamber 20 formed within the housing 10 meets the plate 32 in radial line contact. One radial line contact will be formed between the upper surface 26, Figure 2, of the chamber, and the upper surface 60 of the disc 32. The lower surface 30 of the motor chamber likewise meets the disc in line contact and engages the lower surface 62 along a line which is diametrically opposite to the line contact formed on the upper surface of the disc.

The line contact formed between the inner surfaces of the chamber and disc separates the various pressure zones within the chamber. This will best be understood with reference to Figures 8 through 12.

As illustrated by the legend of Figure 8, the three pressure zones will be indicated by different shading. The inlet pressure will, of course, be the highest pressure, the intermediate pressure will be lower and the exhaust pressure will be substantially at atmospheric for normal exhaust conditions into the surrounding air. The description of Figures 8 through 12 assumes that the apparatus will be operated as a motor but it will readily be seen that the division into zones of different pressure will occur upon operation as a compressor as well.

In the series of Figures 9 through 12, the Figures "a" illustrate the top surface 60 of the nutating plate 32, and the shaded areas indicate the pressures to which the surface areas are exposed. The complete disc is illustrated in Figs. "a" and "b" having the supporting spherical ball 34 and the central driving pin 43 and with certain parts slightly enlarged over the other views of the drawings. The various positions of the line contact between the surfaces of the plate and the motor chamber are shown for different progressive positions of the plate. In Figures 9, the plate is shown with the contact line positioned 60° from the inlet which is illustrated at 64, this being the location where gas enters the motor chamber. In Figure 10, the plate 32 has moved with a nutating motion to a position where the line seal is 150° from the inlet, as indicated by the caption on the drawing. Each drawing is indicated by a caption as to its position. In Figures 11, the disc is moved to where the seal line is 240° from the inlet and in Figures 12 the seal line is 330° from the inlet.

The Figures "b" of the series of Figures 9 through 12 are schematic illustrations of the plate 32 in perspective, showing that as it tilts or nutates and the seal line changes positions.

The Figures "c" of the series 9 through 12 show the plate 32 from the bottom to illustrate the bottom surface 62 and the pressure zones to which different areas are exposed in different positions of the plate.

Figures 9a and b, the nutating plate 32 is positioned so that the seal line illustrated at 66 extends across the areas 35 and 37 on the upper surface of the plate 32, these areas being opposite each other, or extending past each other. Thus, for this portion of the movement of the plate, it is exposed to three different pressure zones, i.e., the inlet pressure zone, the intermediate pressure zone, and the exhaust pressure zone. At that position of the plate 32, as illustrated in Figure 9c, the seal line or contact line for the bottom surface 62 of the plate is shown by the dotted line 68, and is diametrically opposite or 180° spaced from the seal line 66 at the top of the plate. This divides the lower surface into two zones, the inlet pressure zone and the exhaust pressure zone.

It will be noted that only when the contact line extends across the two adjacent areas of the plate 32, such as occurs when contact line 66 engages both the areas 35 and 37, as illustrated in Figures 9a and b, will an intermediate pressure zone be present. As will be seen this occurs because the large end of the plate extends beyond the inlet 64 i.e., the outlet port is spaced circumferentially beyond the inlet so that the lines of contact 66 can extend therebetween and separate the ports. As soon as the contact line shifts in location with movement of the plate 32, so that it extends across only one area of the plate, there will be only an inlet pressure area and an exhaust pressure area.

As illustrated in Figures 10a and 10b when the nutating plate 32 has moved to where the upper seal line 68 is about 150° from the inlet, the upper surface 60 is exposed to two pressure zones, the inlet pressure and the exhaust pressure. As illustrated in 10c, the seal line 70 on the lower surface 62 of the plate again divides the lower surface into two different pressure zones.

Figures 11a and 11b illustrate the pressure zones formed within the housing of the motor when the nutating plate 32 has moved to where the upper seal line 72 is at 240° from the inlet 64. At this position of the plate 32, the seal line 74 between the lower surface 62 of the plate and the motor chamber extends across areas 75 and 76 which are adjacent each other. Therefore, the lower surface is exposed to three pressure zones.

When the nutating disc 32 moves still further so that the upper seal line 78 is 330° from the inlet 64, the upper seal line 78 would appear as shown in Figures 12a and 12b, and the lower seal line 80 will be diametrically opposite, in the location shown in Figure 12c. Thus, in following Figures 9 through 12 the progression of the pressure areas along the plate 32 will be observed, and it will be readily seen how this progression of pressure areas will exert a nutating force on the plate 32 to drive it. The nutating motion of the plate, of course, rotates the pin 43 to drive the shaft 48 in rotation. It will also be recognized that since the plate area widens, that the chamber for the gas becomes larger.

In summary of the operation of the disc, as the disc moves in the housing, two radial line contacts are made between the disc or plate in the housing which are 180° apart. These lines of contact continuously move around with the crank as the disc nutates and divide the housing into pressure zones. In order to have an expanding cycle which is a special feature of the present motor, the voluted plate must separate from the sphere at its inner edge and continue around for something beyond the first 360° of the plate. The amount that the diaphragm extends is determined by the amount of expansion desired. The web which extends from the upper to the lower surface of the housing separates the parts of the plate which extend beyond each other and which make the plate extend beyond the 360° point.

The three rotating zones, each of which contain gas at a different pressure, are formed by the plate in the housing which create the radial lines of contact. These zones effectively rotate around the housing carrying the gases from inlet to discharge. The first zone is open to inlet and inlet pressure exists in this zone. The second zone extends from the first contact line between the plate and motor chamber to the same line of contact but which extends across the adjacent portion of the plate.

Pressure in this intermediate or second zone is equal to inlet pressure when the zone is first formed, but decreases as the crank rotates and the volume increases with movement of the contact lines. This is the expanding part of the cycle.

The third zone is always open to exhaust and the volume in this zone continually decreases, forcing the expended gases out of the motor. Gases enter the motor in the first zone, expand in the second zone, and are discharged from the third zone.

Thus, adiabatic expansion occurs in the second or intermediate pressure zone. The shape of the disc or plate is plotted and formed so that ideal expansion can be achieved for the type of gas used, thus obtaining optimum performance. Furthermore, the amount of expansion can be controlled by the length of overlap between the inner and outer portions of the spiral plate.

The foregoing has presented a description of the action of the gases as they move through the chamber, and act on the nutating disc. The overall operation of the apparatus will now be described.

Figure 3:
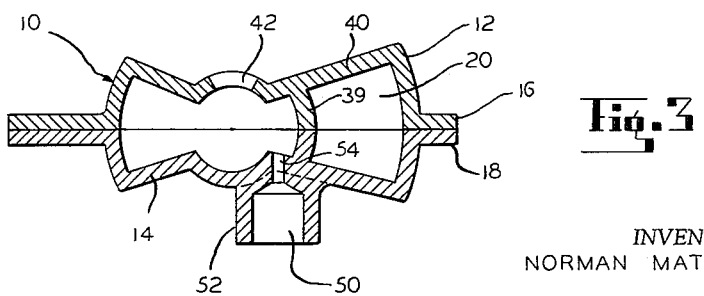
Figure 3 is a vertical sectional view taken along line III—III of Figure 1, and illustrating the locations of the inlet passageways, and with the disc removed.
Figure 5:
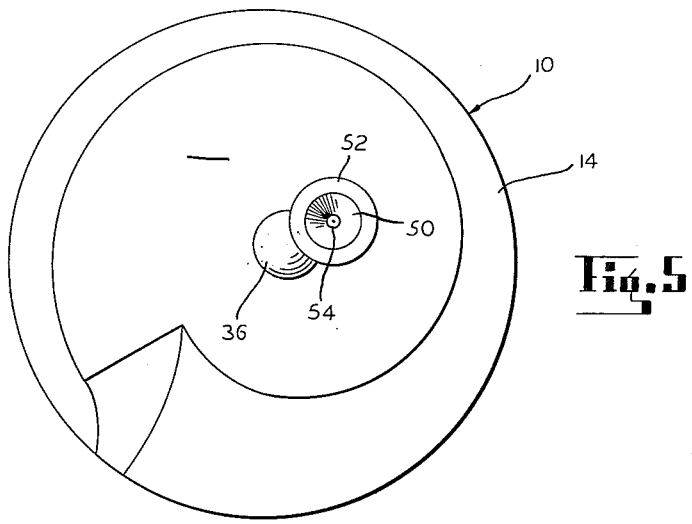
Figure 5 is a plan view taken from the bottom of the mechanism of Figure 1.

In operation as a motor, gas under pressure will be delivered to an intake passageway 50, as illustrated in Figures 3 and 5. The passageway is formed in a boss 52, which is integral with the housing 10, and which tapers to a small inlet passageway 54 leading to a chamber 56 to supply pressurized gas to both the upper and lower side of the plate 32.

As the gas flows above and below the plate with the wobbling motion thereof, the gas will expand adiabatically along the increasing width of the volute shaped chamber 20.

The expanding gas is discharged through a tangential discharge passageway 58, which communicates with the large end of the chamber 20.

If the motor is to be used as a compressor, gas to be compressed is admitted through the passageway 58 and compressed by wobbling motion of the plate 32 to be discharged through the passageway 50. For use either as a motor or a compressor, the passageways are connected to suitable gas supply and delivery lines.

Figure 6:
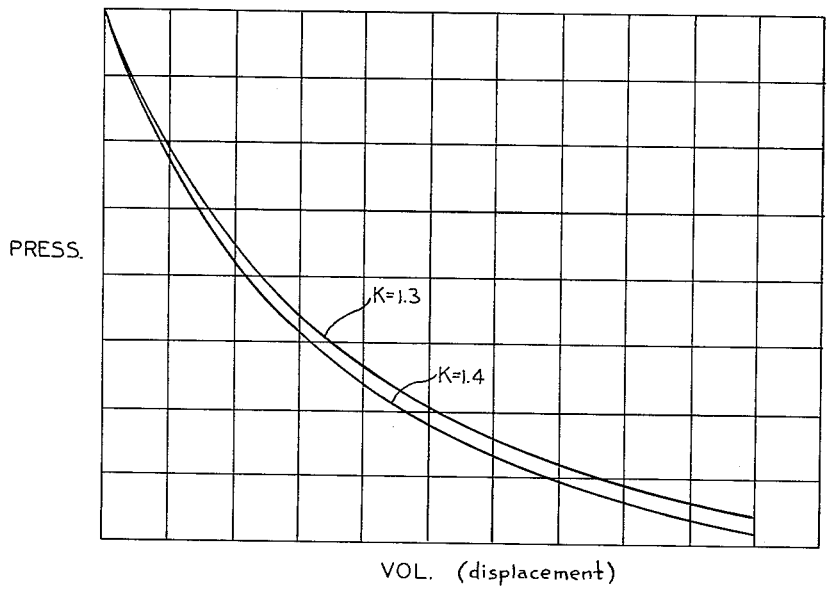
Figure 6 is a portrayal by a graph of the relationship between gases having different specific heats plotted against pressure and volume.

With reference to Figure 6, the shape of the volute motor chamber 20 is constructed in accordance with the specific heat of the gas used. With K indicating the specific heat of a gas, the graph illustrates two gases plotted against pressure and volume. The lower curve is for air with K equaling 1.4. The upper curve indicates the pressure-volume curve for another gas wherein K=1.3. The chart indicates how the chamber will be designed for ideal adiabatic expansion for the particular gases used.

Figure 7:
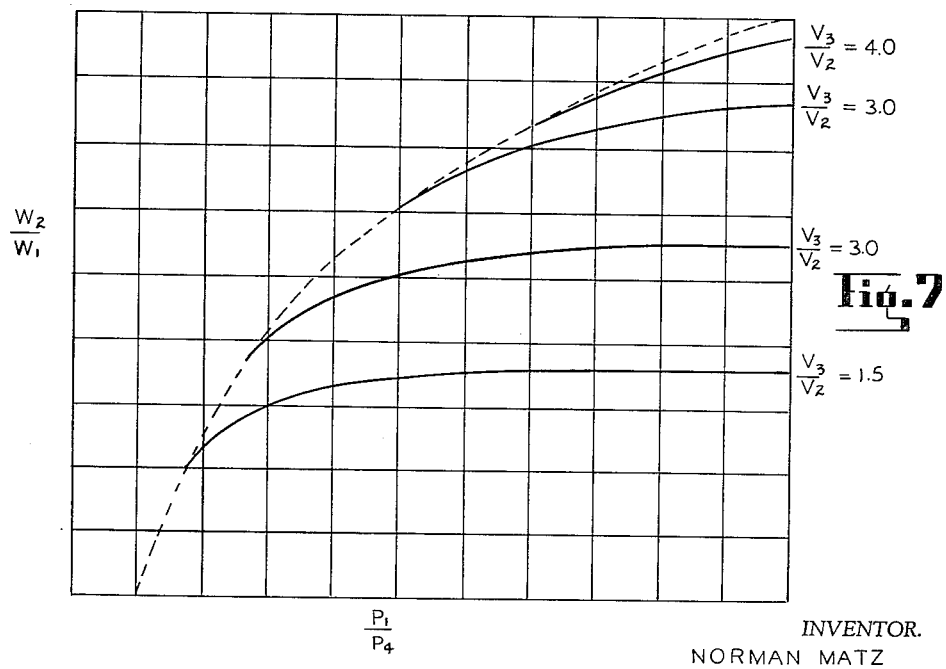
Figure 7 is a graph wherein the expansion of a gas to different discharge pressures is illustrated and is plotted against degree of improvement and pressure ratio.

In the chart of Figure 7, the degree of improvement is plotted against pressure ratio, this indicates the increased amount of work obtained from the gas. As will be indicated from the graph, the amount of work obtained increases with increased pressure differential between inlet and exhaust pressure. The graph is plotted with several curves, with the uppermost curve indicating total expansion of the gas, and with the lower curve indicating limited expansion. In the curve, the medium used was air with K=1.4, although similar curves would be required for other gases. In plotting the curve, the following values were used.

$P_1$=inlet pressure (lb./ft.$^2$ abs.)
$P_4$=exhaust pressure (lb./ft.$^2$ abs.)
$V_3$=volume after expansion (ft.$^2$)
$V_2$=volume before expansion (ft.$^2$)
$W_2$=added work (ft.-lb.)
$W_1$=work without expansion (ft.-lb.)
K=ratio of specific heats In operation of the mechanism as a motor, pressurized expansive gas is admitted through the inlet passageway 50 and enters the chamber 56 to pass above and below the wobbling plate or disc 32. The disc is driven in its nutating movement to rotate the driving pin 43, which drives the crank arm 46 to rotate the shaft 48. The gas expands adiabatically along the volute shaped chamber 20 to be discharged out through the tangential discharge passageway 58.

If the mechanism is to be operated as a compressor, gas to be compressed is fed in through the passageway 58, and the wobbling or nutating plate 32 is driven in its motion by driving the shaft 48, which causes the crank arm 46 to rotate the drive pin 43. The gas is compressed along the volute chamber 20, and is discharged through the passageway 50.

Thus it will be seen that I have provided an improved mechanism which may be used as either a motor or compressor which meets the objectives and advantages hereinbefore set forth. The mechanism is constructed to obtain added work, when used as a motor, by allowing adiabatic expansion of the gas. The chamber is designed for the pressure ratios of the specific gas used in accordance with the specific heat thereof. The invention, in the form shown, or in other forms which the inventive principles may take, finds numerous advantageous operations wherein improved efficiency and effective use may be utilized.

I have, in the drawings and specification, presented a detailed disclosure of the preferred embodiments of my invention, and it is to be understood that I do not intend to limit the invention to the specific forms disclosed, but intend to cover all modifications and methods falling within the scope of the principles taught by my invention.

I claim as my invention:

1. An expansible gas driven motor comprising in combination a curved volute-shaped motor chamber for receiving expanding gas shaped to expand in cross-section as a function of the specific heat of the gas to be used for adiabatic expansion of the gas, a flat spiral-shaped plate positioned within said chamber and having a width to extend across the chamber and to separate upper and lower sections of the chamber, said chamber having an upper curved tapered surface for rolling line contact with the plate and having a lower tapered curved surface for rolling line contact with the plate, said plate moving with a wobbling nutating motion when driven by expansible gas, a gas inlet passageway connected to the small end of said chamber for communication both above and below said plate, a tangentially extending gas exhaust passageway connected to the large end of the chamber for the exhaust of gas from both above and below said plate, a central support for said plate maintaining it in position during wobbling motion, and a drive member connected to the plate to move with a nutating motion for deriving power from the plate.

2. A power driven gas compressor comprising a curved volute shaped compressor chamber having internal spirally shaped walls to form a chamber of decreasing width and having a truncated conically shaped upper surface and a similar truncated conically shaped lower surface, a spirally shaped flat plate substantially the width of the chamber and located within the chamber for rolling engagement with the upper and lower surfaces of the chamber, a compressed gas discharge passageway leading from the small end of said chamber, an inlet gas passageway leading tangentially into the large end of said chamber, and means connected to said plate for driving it in a wobbling nutating motion for compressing the gas within the chamber and forcing it from the large end to the small end on both surfaces of the plate.

3. A motor driven by an expansible gas comprising a volute-shaped motor chamber having outwardly tapered curved upper and lower surfaces and having a small end and a large end, an inlet passageway at the small end of the chamber for receiving an expansible gas, an exhaust passageway at the large end of the chamber for the discharge of the gas after it has expanded, a flat plate shaped to fit the chamber and being the width of the chamber and adapted to be located within the motor chamber to move with a wobbling rolling motion against the tapered surfaces as gas expands within the chamber, and means secured to the plate for transmitting driving power from the plate as it moves.

4. A motor to be driven by an expansible predetermined gas comprising a curved shaped chamber having fixed tapered curved upper and lower surfaces and fixed sides increasing in width and cross sectional area for a substantial length of the chamber as a function of the specific heat of said predetermined gas to be used in the chamber and having a small end and a large end, an intake passageway at the small end for the intake of a gas, an exhaust passageway at the large end of the chamber for the discharge of the gas after it has expanded, a curved flat plate being the width of the chamber and adapted to be located within the motor chamber to move with a wobbling rolling motion against the tapered surfaces as gas expands within the chamber, and means secured to the plate for transmitting driving power from the plate as it moves.

5. A motor driven by an expansible gas comprising a curved volute-shaped motor chamber having a configuration with a tapered curved upper and lower surface and increasing in width to obtain an increasing cross sectional area along chamber for adiabatic expansion of the gas to be used as an operating medium and having a small end and a large end, in inlet passageway at the small end of the chamber for receiving an expansible gas, an exhaust passageway at the large end of the chamber for the discharge of the gas after it has expanded, a flat plate shaped to fit the chamber and being the width of the chamber and adapted to be located within the motor chamber to move with a wobbling rolling motion against the tapered surfaces as gas expands within the chamber, and means secured to the plate for transmitting driving power from the plate as it moves.

6. A motor driven by an expansible gas comprising a volute motor chamber having outwardly tapered curved upper and lower surfaces and having a small end and a large end, an inlet passageway at the small end of the volute for receiving an expansible gas, an exhaust passageway at the large end of the volute for the discharge of the gas after it has expanded, a flat plate shaped to fit the chamber and being the width of the chamber and adapted to be located within the motor chamber to move with a wobbling rolling motion against the tapered surfaces as gas expands within the chamber, and means secured to the plate for transmitting driving power from the plate as it moves.

7. A mechanism for use in an engine or a compressor comprising a curved volute shaped closed chamber having conically tapered curved upper and lower surfaces and having a small end and a large end, a spiral plate having uninterrupted substantially flat surfaces and being the width of the chamber and located within the chamber for nutating motion to progressively change the cross sectional area between the chamber and the plate, a first gas conducting passageway communicating with the small end of the chamber both above and below the surface of the plate, a second gas conducting passageway leading tangentially into the large end of the chamber and communicating with space above and below the plate, and rotary power transmission means connected to the plate to permit power transmission for driving the plate or for driving the transmission means from the plate as the mechanism is respectively used as a compressor or a motor.

8. A motor driven by an expansible gas comprising a volute motor chamber having outwardly tapered curved upper and lower surfaces and having a small end and a large end, an inlet passageway at the small end of the volute for receiving an expansible gas, an exhaust passageway at the large end of the volute for the discharge of the gas after it has expanded, a flat plate shaped to fit the chamber and being the width of the chamber and located within the motor chamber to move with a wobbling rolling motion against the tapered surfaces as gas expands within the chamber, said inlet and exhaust passageways displaced along said volute shaped chamber a sufficient distance so that they will always be separated by the plate making line contact with said tapered upper and lower surfaces, and means secured to the plate for transmitting driving power from the plate as it moves.

9. A motor driven by an expansible gas comprising a closed spiral motor chamber adapted to receive a pressurized operating gas, a movable flat plate housed within the chamber to move with the nutating motion, driving means secured to the plate for deriving rotary motion, from the nutating plate, conically-shaped surfaces within the chamber for meeting the plate with sealing line engagement with movement of the plate, said plate being spirally curved in shape and with one end extending past the other end to extend for more than 360° within the chamber, a gas inlet port leading to the chamber at one end of the plate, and a gas exhaust port leading from the chamber at the other end of the plate.

10. A motor driven by an expansible gas comprising a volute motor chamber having outwardly tapered curved upper and lower surfaces and having a small end and a large end, an inlet passageway at the small end of the volute for receiving an expansible gas, an exhaust passageway at the large end of the volute for the discharge of gas after it expands, the volute chamber extending a distance greater than 360° so that said small end lies radially opposite of said large end, a flat nutating plate shaped to fit within the chamber and having a large end which extends past a small end so that the plate surface extends for a circumferential distance more than 360°, a gas inlet into the small end of the volute motor chamber, and a gas exhaust port leading from the large end of the volute chamber whereby the plate will move with a nutating motion and create a first inlet pressure zone, a second intermediate pressure zone, and an exhaust pressure zone with the inlet pressure zone communicating with the inlet port and the exhaust pressure zone communicating with the exhaust port, said intermediate pressure zone continually increasing in size with the increase of area of the plate whereby an adiabatic expansion of the gas occurs for driving the plate.

11. A motor driven by an expansible gas comprising a motor chamber adapted to receive a pressurized gas, a movable plate having upper and lower reaction surfaces in said chamber substantially the width of the chamber and movable by pressure of the gas, means to deliver gas to one end of the chamber alternately above and below the plate, said chamber and plate being spiral shaped so that as the chamber volume increases with movement of said plate increasing areas of said surfaces will be exposed to said gas for substantially the full length of the chamber, and a discharge passageway leading from the other end of the chamber for the discharge of expanded gas.

12. A motor driven by an expansible gas comprising a closed motor chamber adapted to receive a pressurized operating gas, a movable nutating plate within the chamber having flat upper and lower surfaces for engagement along a radial line with the chamber and having a first end and a second end extending radially outside of the first end and circumferentially past the first end, a vertical web extending through the chamber axially and extending in a curved plane circumferentially and between said first and second end whereby the ends of the plate that extend past each other extend to different chambers of different gas pressures separated by said web, a gas inlet port leading into said chamber at one side of said web, and a gas exhaust port leading from the chamber at the other side of said web, 13. A motor driven by an expansible gas comprising a spirally shaped motor chamber adapted to receive a pressurized gas and extending for more than 360°, a spirally shaped flat plate movable within the chamber, said chamber having curved upper and lower walls tapered inwardly toward the center, said plate meeting the walls in substantially radial line contact and in a range of positions engaging the chamber at two locations to divide the chamber into a first pressure zone for operation at a first pressure, a second pressure zone between said two locations for operation at a second pressure lower than said first pressure, and a third pressure zone for operation at an exhaust pressure lower than said first and second pressures, means for receiving power from the motion of said movable plate, an inlet port communicating with said first zone, and an exhaust port leading from said third zone.

14. A motor driven by an expansible gas comprising a closed spirally shaped motor chamber adapted to receive a pressurized operating gas, a movable spirally shaped nutating plate within the chamber having flat upper and lower surfaces for engagement along radial lines within the chamber and having a first end and a second end extending past the first end with the plate extending for more than 360°, a gas inlet port leading into said chamber at the first end of said plate, and a gas exhaust port leading from the chamber at the second end of the plate, sadi gas exhaust port positioned circumferentially offset from said gas inlet port so that the plate may form radial lines of contact with the chamber across both said first end and said second end with both of said lines of contact being between said inlet port and said outlet port to form an area of the plate isolated from both said inlet and said outlet ports.

15. A compressor for compressing gases comprising a curved compressor chamber having curved outer and inner walls defining the sides of the chamber with said walls decreasing in radius to form a spiral shaped chamber and to decrease the chamber width from a large inlet end to a compressed gas smaller outlet end and having an upper and lower tapered curved surface, an inlet passageway communicating with the large end of the chamber for the intake of gas to be compressed, a discharge passageway communicating with the small end of the chamber for delivering compressed gas from the compressor, a curved flat plate shaped the width of the chamber and adapted to move with a wobbling nutating motion to compress gas, and means secured to the plate for driving it in its motion to operate the compressor.

16. A motor driven by an expansible gas comprising a substantially flat surfaced plate to be exposed to an expansible gas and driven in a nutating motion, means defining a gas chamber enclosing said plate for nutating motion therein so that the plate will engage the inner surface of the chamber in line contact forming separated chambers at each side of said line of engagement, means connected to the plate for transmitting the motion of the plate to obtain a usable power, inlet means opening into the chamber for transmitting gas to said chamber, and exhaust means opening from the chamber for exhausting gas from said chamber, said plate having one end extending past the other circumferentially with said inlet and exhaust means at the plate ends so that the plate will have line engagement with the chamber at two locations on the same surface of the plate isolating a flat surface area of said plate from said inlet and said exhaust means between said inlet and said exhaust means when the gas is passing from the inlet to the exhaust means so that a movable surface area of the plate is exposed to confined gas so that the energy of the confined gas is utilized and the plate is driven.

References Cited in the file of this patent

UNITED STATES PATENTS

| | | |
|---|---|---|
| 442,401 | Shaw | Dec. 9, 1890 |
| 2,033,577 | Hunter | Mar. 10, 1936 |
| 2,353,373 | Thompson | July 11, 1944 |
| 2,590,751 | Byram et al. | Mar. 25, 1952 |
| 2,788,747 | Hunter | Apr. 16, 1957 |
| 2,887,059 | Cornelius | May 19, 1959 |

FOREIGN PATENTS

| | | |
|---|---|---|
| 8,227 | Great Briain | of 1911 |
| 16,819 | Great Britain | of 1902 |